Aug. 23, 1949.  R. J. INGHAM, JR  2,479,620
SAFETY VALVE FOR COOKERS
Filed Nov. 15, 1945
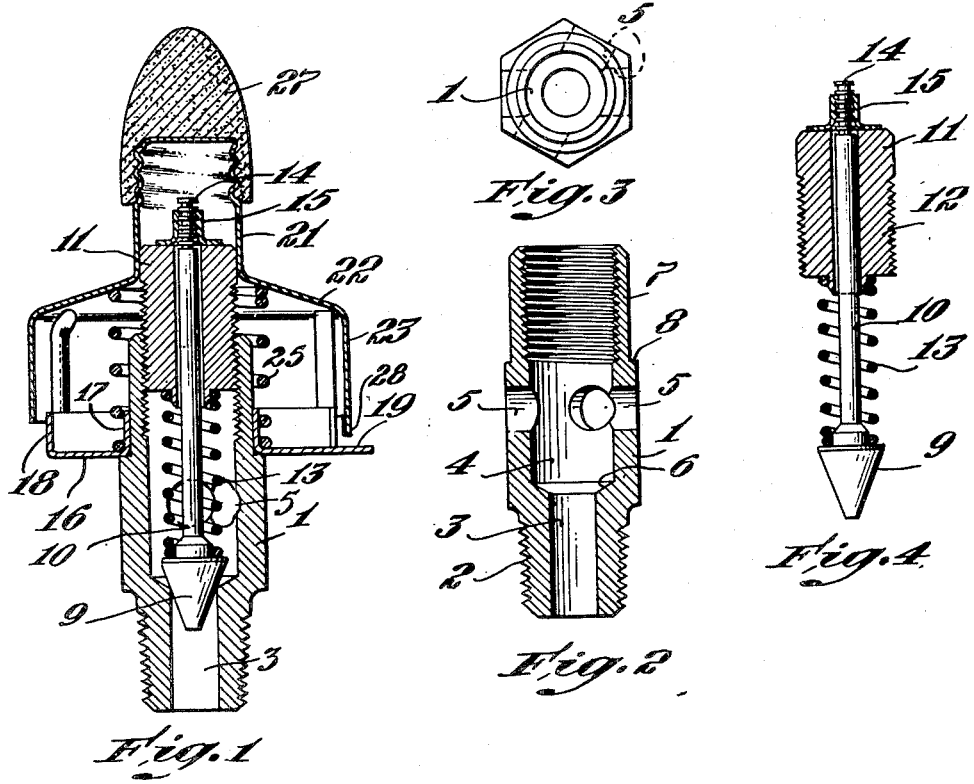
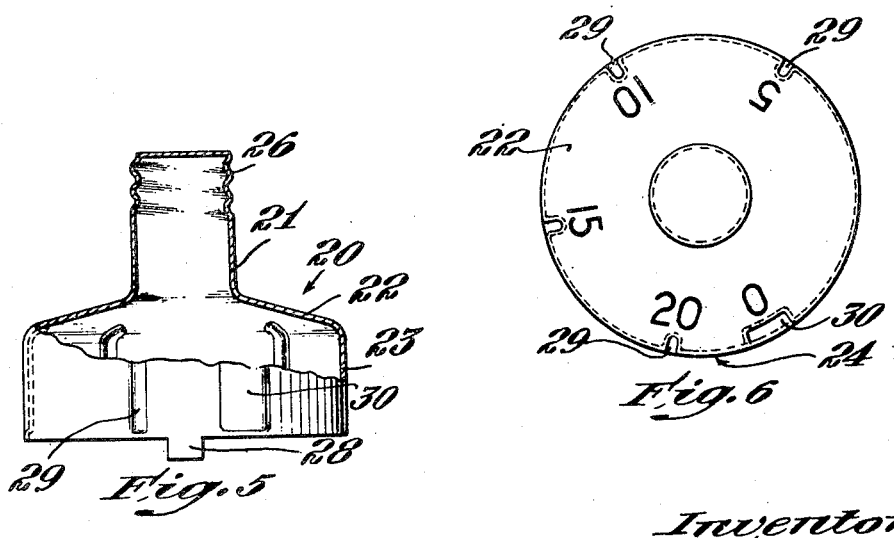
Inventor
Robert J. Ingham Jr.
by Roberts Cushman & Grover
att'ys.

Patented Aug. 23, 1949

2,479,620

UNITED STATES PATENT OFFICE 2,479,620

SAFETY VALVE FOR COOKERS

Robert J. Ingham, Jr., Fairfield, Conn., assignor to Manning, Maxwell & Moore, Incorporated, New York, N. Y., a corporation of New Jersey Application November 15, 1945, Serial No. 628,941

1 Claim. (Cl. 137—53)

This invention pertains to pressure regulators and more especially to a combined pressure regulator and safety valve. While of more general utility, the invention is especially desirable in its application to pressure cookers.

Pressure cookers, in particular those designed for domestic purposes, are customarily provided with a safety valve of one sort or another designed automatically to open and relieve the pressure within the cooking vessel when the pressure reaches a predetermined value. Most commonly the valve is spring loaded and is set to open at one particular pressure, as determined by the maker, for instance to open when the pressure rises above the 15 lbs. per square inch which is a customary processing pressure. Usually a gauge is associated with the safety valve. By carefully watching the gauge and correspondingly regulating the heat supplied, the user may be able to maintain a working pressure at some value below that at which the safety valve is set, for instance 5 lbs. per square inch, or 10 lbs. per square inch, which are pressures sometimes employed in food processing, but to do so requires constant supervision and is especially difficult when the heat source is an electrical coil controlled by a switch having only one or two settings. It has been proposed to provide a relief valve for pressure cookers with capability of adjustment as respects the pressure at which it opens, but so far as is known to me, such adjustable valves are without any means whereby they may be set at a definite opening pressure, and adjustment is only obtained by trial and error and by reference to an associated gauge.

Another type of relief valve employed on pressure cookers employs a dead weight to hold the valve seated, the valve automatically opening only when the pressure within the vessel is sufficient to lift this particular weight. No provision is made for varying the pressure at which the valve opens, except by the employment of a series of different weights, an arrangement which is not altogether to be desired because of the readiness with which the independent weights may be misplaced.

Among the objects of the present invention is to provide a pressure regulator combined with a safety valve, of very simple, inexpensive and compact type especially useful in association with domestic pressure cookers, and so designed that the user may adjust it without reference to a gauge so as to open at any one of a range of predetermined different pressures. By this means and by such adjustment of the regulator the cooker may be set to process food at any of several different pressures, and automatically to relieve the pressure if the selected processing pressure be exceeded. Thus the necessity for an associated gauge is eliminated, a constant cooking pressure, regardless of the amount of heat supplied, is assured, and constant attention during cooking becomes unnecessary. A further object is to provide a regulator designed to relieve the pressure at any one of several selected pressures, but which may be adjusted throughout its entire operating range by the turning of an adjusting element through an angle not exceeding 360°, thus providing for very rapid, simple and easy adjustment. A further object is to provide a pressure regulator so devised that while a single turn of a manually actuable element suffices to adjust the regulator throughout its entire range, it can not be set to a pressure beyond the upper limit fixed by the maker of the device. A further object is to provide a pressure regulator so designed that it may readily be manually adjusted to open position, thereby to permit the uninterrupted escape of pressure fluid from the container, but only at such a rate as to avoid violent boiling and excessive evolution of steam in response to sudden reduction in pressure.

Other and further objects and advantages of the invention will be pointed out in the following more detailed description, and by reference to the accompanying drawings wherein Fig. 1 is a diametrical section, to large scale, showing the combined regulator and safety valve with the valve head seated;

Fig. 2 is a diametrical view to the same scale as Fig. 1, showing the casing only of the regulator;

Fig. 3 is a plan view of the device shown in Fig. 2;

Fig. 4 is a side elevation of the valve unit removed from the casing;

Fig. 5 is a side elevation, partly in diametrical section, and to larger scale, of the indicating cap of the regulator; and Fig. 6 is a plan view of the device shown in Fig. 5.

Referring to the drawings, the numeral 1 designates the casing of the device, this casing being generally cylindrical in contour and having an externally screw-threaded lower end portion constituting a nipple whereby the device may be mounted in a screw-threaded opening in the cover of a pressure cooker or the like. Immediately above this nipple portion the casing may, if desired, be of polygonal external contour to facilitate application of a wrench. An escape passage 3 extends axially through the nipple portion of the casing and merges with a valve chamber 4 which communicates with the atmosphere by means of delivery orifices 5. Where the escape passage 3 merges with the valve chamber 4, the casing is provided with an annular valve seat 6, here shown as beveled. The upper portion of the casing is internally screw threaded at 7 and is preferably provided with an external shoulder at 8.

The valve comprises a head 9, here shown as of truncated conical form designed to cooperate with the seat 6 to close the escape passage 3. The valve head 9 is secured to the lower end of an elongate rigid stem 10, which passes through an axial bore in a sleeve 11 which is externally screw threaded at 12 for engagement with the screw threads 7 in the upper part of the casing. A valve loading spring 13, here shown as a coiled compression spring, is interposed between the valve head and the lower end of the sleeve 11. The upper end of the valve stem is provided with ribs at 14, and a stop or abutment element 15, here shown as an eyelet, is mounted on the upper end of the stem after the spring 13 has been introduced between the valve head 9 and the sleeve 11 and after the latter has been threaded over the stem. This stop member 15 is swedged or otherwise permanently united to the ribbed portion of the stem so as to hold the parts in assembled position as a unit, as shown in Fig. 4. This unit may be introduced into the casing and removed therefrom, for example for cleaning, without danger that any of its parts will become separated and lost.

An annular abutment 16, which may be of sheet material pressed to the desired shape, is assembled with the casing 1, this abutment having a cylindrical sleeve portion 17 which snugly fits about the upper part of the casing and rests on the shoulder 8 and is secured to the casing, for example by swedging, solder or the like, the abutment 16 preferably having a marginal cylindrical flange 18 from which a limiting element or tang 19 is struck and projects horizontally at one point in the periphery of the abutment.

The rotary spring stressing sleeve 11 is provided with a shroud or canopy device 20 (Fig. 5) which may be of sheet metal or the like, and which comprises the cylindrical upper part 21, which fits snugly about the upper part of the sleeve 11 above the screw threads 12, and which is permanently secured to the sleeve 11 by swedging, solder or the like. This shroud also comprises the outwardly and downwardly sloping portion 22 and the cylindrical peripheral portion 23, the latter being of an internal diameter somewhat greater than the diameter of the cylindrical flange 18 of the abutment 16. A coiled compression spring 25 is housed within the canopy or shroud 20, its upper end bearing against the inner surface of the part 22 and its lower end bearing against the abutment 16, this spring being normally under some stress when the parts are assembled, thereby frictionally opposing rotation of the shroud and preventing any rattling of the parts during the operation of the cooker. The upper end of the cylindrical part 21 of the shroud is preferably ribbed to form an anchorage for an actuating knob 27 preferably of some material which is a poor heat conductor. The lower edge of the cylindrical part 23 of the shroud is provided at one point with a downwardly directed stop member 26. The upper surface of the part 22 of the shroud is provided with circumferentially spaced index characters and the cylindrical part 23 is preferably provided with a vertically elongate indentation 29 corresponding to each of the index characters. Preferably the indentation 30 which corresponds to zero graduation is somewhat wider than the other indentations 29 making it more easily identifiable. While indentations form desirable markers, it is contemplated that other means may be employed, for instance projecting ribs or merely distinctively colored lines on the outer surface of the part 23, thereby to facilitate the setting of the instrument. The stop member 24 is located at a point between the indentation 29 which corresponds to the highest pressure for which the device is designed, and the indentation 30 which corresponds to zero pressure.

The pitch of the screw threads at 7 and 12 is such that rotation of the sleeve 11 through somewhat less than 360° stresses the spring 13 from zero load to the highest load for which the instrument is designed. The length of the stop member 26 below the lower edge of the part 23 is such that when the sleeve 11 is being turned in the spring-stressing direction the stop will engage the tang 19 when the spring has been stressed to the highest point in the operating range. On the other hand, the length of the stop element 26 is such that when the sleeve 11 is being turned in the reverse direction and approaches the zero loading position, the stop 26 will pass freely over the limiting element or tang 19 as the rotation is continued. Continued rotation in this unloading direction will cause the upper end of the sleeve 11 to engage the stop or abutment member 15 on the valve stem, thereby positively lifting the valve from its seat. It is thus possible for the user to lift the valve from its seat so as to relieve the pressure within the cooker whenever it is desired to do so. When the valve is so lifted manually at a time when the pressure in the cooker is above that of the atmosphere, the pressure fluid within the cooker will escape through the delivery orifices 5, but as these are located below the horizontally extending abutment member 16, there is little danger that the operator will be burned by the escaping fluid. Furthermore, the direction of the escaping pressure fluid is abruptly changed as it passes from the escape passage 3 to the orifices 5, so that its velocity is somewhat reduced and thus the rate of discharge is limited so that danger of violent boiling and unduly rapid evolution of steam when the valve is thus manually opened, is avoided.

In the ordinary use of the device, and assuming that the regulator has been applied to a pressure cooker, the operator will turn the knob 27, thus rotating the shroud 20 and the sleeve 11 until a selected index character on the part 22 is arranged to correspond to the position of the limiting element or tang 19, the proper setting being facilitated by the provision of the indentations 29 and 30. When thus set the spring 13 is thereby so loaded that it will hold the valve closed until the pressure within the container rises to correspond to the chosen index character on the shroud. Any further rise in pressure automatically opens the valve and allows pressure fluid to escape, thus preventing further rise in pressure and usually reducing the pressure to a point at which the valve will again close. The cooking pressure is thus maintained substantially at the pressure selected without any supervision by the user. When the cooking operation has been completed the valve may be positively lifted from its seat and held open until the pressure in the container has dropped to the zero point at which it is safe to remove the cover from the cooker. With this arrangement it is thus possible to carry out the cooking operation at any one of a plurality of selected pressures, while at the same time a safety arrangement is provided which prevents excess pressure in the cooker, regardless of the selected pressure at which the cooker is intended to operate. Furthermore, the device is compact and self-contained with no parts which are liable to be lost or mislaid, it is simple in construction and easy to manipulate, and the various operative elements including the sleeve 11, the valve, and the spring 13, may be removed as a unit from the casing to facilitate cleaning.

While one desirable embodiment of the invention has been illustrated and described by way of example, it is to be understood that the invention is broadly inclusive of any and all modifications falling within the scope of the appended claim. It is further to be understood that while for convenience in illustration and description the device has been shown with the valve stem extending vertically and with the valve head at its lower end, this position of the device is not essential to its proper operation, and where herein reference is made to the "top" and "bottom" of the device, or of its constituent parts, these references are merely with respect to the device as it is here illustrated, and are not to be regarded as having any limiting intent.

I claim:

A pressure regulator of the kind wherein a casing houses a valve cooperable with a seat to close an escape passage, a spring for urging the valve toward its seat, and means for stressing the spring, characterized in that the casing is internally screw threaded at its upper portion and has lateral discharge orifices above the valve seat leading from the escape passage to the atmosphere, a screw-threaded sleeve having engagement with the threaded portion of the casing so that rotation of the sleeve relatively to the casing moves the sleeve axially, a valve-loading spring abutting at its upper end against the sleeve and at its lower end against the valve, an annular external abutment fixed to the casing, said abutment having a radially projecting tang at its edge, an annular hollow shroud fixed to the sleeve to turn therewith, said shroud having circumferentially spaced external index characters thereon, and a spring interposed between the shroud and said annular abutment thereby frictionally to oppose rotation of the shroud, the shroud having a substantially cylindrical upper part and a knob of low heat-conducting material fixed to said cylindrical part and constituting means for manually turning the shroud and sleeve, the shroud having a downwardly projecting stop element at its lower edge operative to engage the fixed tang of the abutment, to limit turning of the sleeve in the spring-stressing direction, the pitch of the screw threads on the sleeve and casing being such that a single turn of the sleeve varies the spring stress from zero to the maximum load for which the apparatus is designed.

ROBERT J. INGHAM, Jr.

REFERENCES CITED

The following references are of record in the file of this patent:

UNITED STATES PATENTS

| Number | Name | Date |
|---|---|---|
| 1,033,136 | Wennerston | July 23, 1912 |
| 1,328,653 | Ferris | Jan. 20, 1920 |
| 1,569,187 | Jewell | Jan. 12, 1926 |
| 2,051,100 | Nelson | Aug. 18, 1936 |
| 2,107,704 | Kronquest | Feb. 8, 1938 |
| 2,200,903 | Stephens | May 14, 1940 |
| 2,210,473 | Testa | Aug. 6, 1940 |